United States Patent [19]
Grinblat

[11] Patent Number: 6,056,409
[45] Date of Patent: *May 2, 2000

[54] MICROSCOPE CAMERA ADAPTER WITH CONTROL MOTORS

[76] Inventor: Avi Grinblat, 25 Central Park West—Apt 4V, New York, N.Y. 10023

[*] Notice: This patent is subject to a terminal disclaimer.

[21] Appl. No.: 08/891,951

[22] Filed: Jul. 14, 1997

Related U.S. Application Data

[63] Continuation-in-part of application No. 08/426,958, Apr. 24, 1995, Pat. No. 5,652,676.

[51] Int. Cl.[7] .......................... G02B 7/182; G02B 21/36; H04N 7/18
[52] U.S. Cl. .......................... 359/503; 359/363; 359/223; 359/876
[58] Field of Search ..................... 359/363, 503, 359/876, 877, 226; 348/75, 79

[56] References Cited

U.S. PATENT DOCUMENTS

| | | | |
|---|---|---|---|
| 4,002,830 | 1/1977 | Brown et al. | 359/876 |
| 5,353,167 | 10/1994 | Kuklo et al. | 359/876 |
| 5,652,676 | 7/1997 | Grinblat | 359/363 |

*Primary Examiner*—Jon Henry
*Attorney, Agent, or Firm*—Eliot S. Gerber

[57] ABSTRACT

An adapter connects a small solid-state television camera to a viewing port of a microscope. The adapter has a zoom lens system to focus the image from the microscope mounted in a zoom lens barrel. The lens barrel is moved by rotation of a shaft of a pulse motor through a worm gear. A mirror within the housing in its normal position, reflects the image 45 degrees and is a flat disk-shaped mirror mounted for universal movement about its center. The angle of the mirror is controlled by a control rod which is connected to a gear bracket by a ball. The gear bracket is moved one direction by a first motor connected to a worm gear. The bracket is moved in another direction by a second motor and gear which meshes with gear teeth on the bracket.

18 Claims, 3 Drawing Sheets

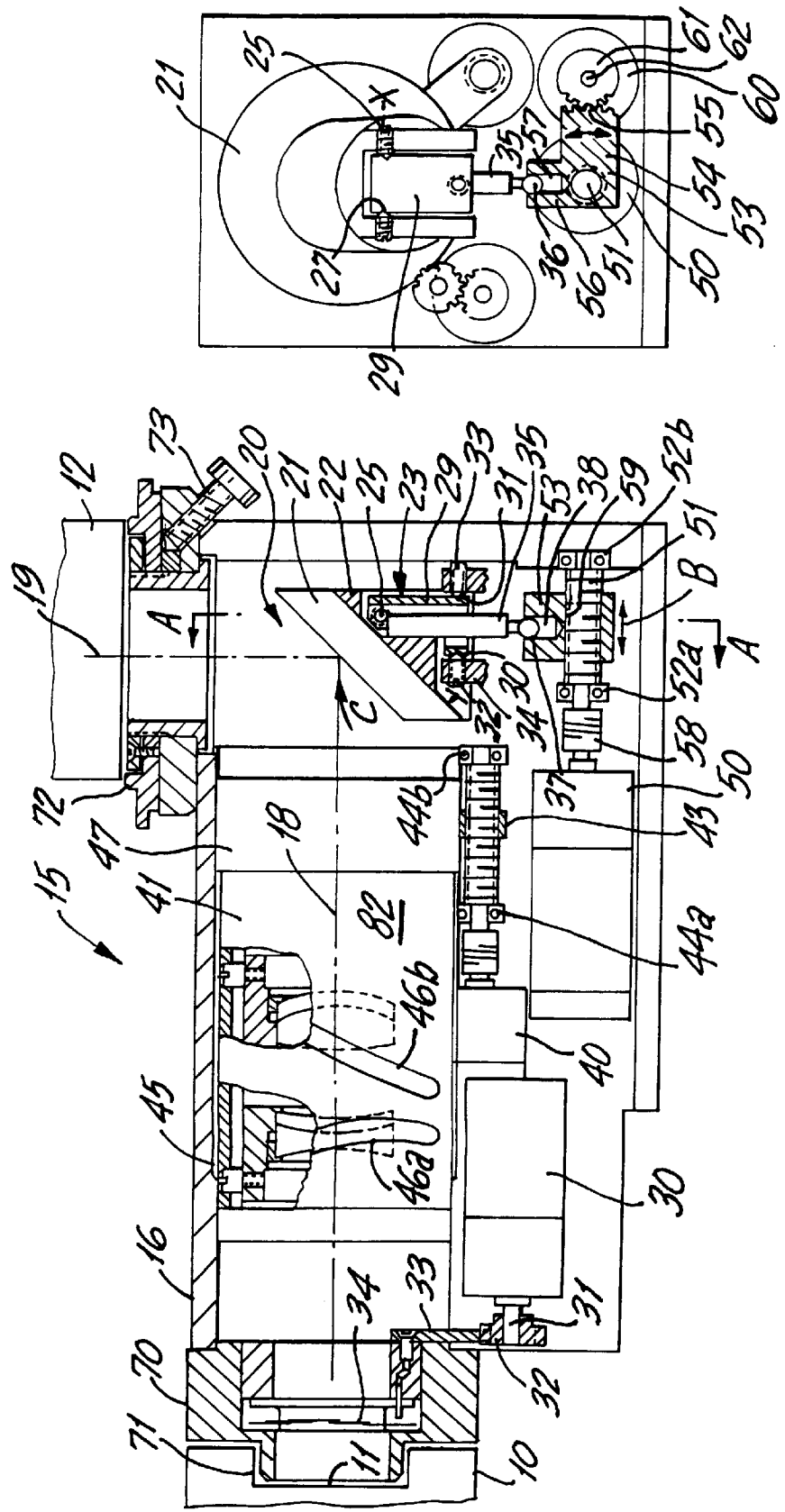

MICROSCOPE CAMERA ADAPTER WITH CONTROL MOTORS

RELATED APPLICATION

This application is a continuation-in-part application partly based on U.S. Application Ser. No. 426,958, filed Apr. 24, 1995, now U.S. Pat. No. 5,652,676.

BACKGROUND OF THE INVENTION

1. Field of the Invention

The present invention relates to adapters to connect a video camera to a microscope and more particularly to such an adapter for connecting a surgical or diagnostic microscope to a camera.

2. Related Art

At the present time a number of adapters are commercially available to connect a "video" camera to a microscope. Video cameras includes video analog, digital video and digital still cameras, including single and multiple CCD (Charge Coupled Devices). Generally the video camera is small and uses a solid-state electronic imaging device, such as a CCD (Charge Coupled Device). The microscope may be a stereo bright field microscope. Such adapters are available from leading scientific and surgical/diagnostic microscope manufacturers including Nikon, Leica-Wild and Zeiss.

When surgical stereomicroscopes are used for certain types of surgery or diagnoses, such as surgery on the ear, nose, throat, brain, spinal cord and eye (especially retina surgery) and other types of microsurgery or diagnoses, it is important that the exact location of interest be centered in the field of view of the image plane of the video camera and that the image be in focus. The image is displayed on a monitor and may be viewed by the operating surgeon, other members of the surgical team and students. The image may be broadcast, for example, a real-time image may be broadcast on the Internet.

In eye surgery, although the patient is fully anesthetized, the eyeball is dynamic and may move. When it does, its image on the monitor also moves so that the operative site may not be centered, and may not even be on the monitor's screen. In brain surgery often the site of the operation is at the edge of the opening, so that it may become outside of the field of view of the camera. In ear surgery the microscope is often tilted at different angles during the operation, which may cause the operative field to be out of the center or field of view of the camera.

In some industrial applications, such as the microscope inspection of circuit boards and integrated circuits, the device being inspected may move slightly during the inspection. It would be useful to move the image, without moving the microscope, the device being inspected or the camera.

If the point of surgical interest is a portion of a patient's retina and it is off-center or out of focus, or even so far off-center to be off the monitor's screen, the displayed image may be confusing or misleading. In many critical surgical operations it is important that the image on the monitor screen is on-center and in-focus. It would be desirable if the image could be moved by an operator, independently from the movement of the microscope and without interfering with the surgeon's delicate work.

Generally the surgeon is fully occupied by the operation and would not move the microscope or the camera to center the image. Also generally the surgeon would not want the microscope touched in order to center the image, as it might disturb his view through the microscope.

U.S. Pat. No. 5,052,789 shows a television camera connected to a stereoscopic microscope. The optical path to the camera includes a pair of prisms and focusing lenses. However, there is no disclosure of a centering mechanism or how the focusing lenses are controlled. U.S. Pat. No. 5,497,267 is entitled "Video Microscope" and was cited in the parent U.S. Pat. No. 5,652,676, incorporated by reference herein.

U.S. Pat. No. 5,002,376 at FIG. 2 shows a surgical stereomicroscope having a zoom tube for a camera. U.S. Pat. No. 4,277,130 discloses a zoom lens system for a camera in a stereomicroscope.

SUMMARY OF THE INVENTION

In accordance with the present invention there is provided an adapter for a microscope, especially a surgical or industrial stereomicroscope, which connects a video camera to the microscope. The adapter permits an operator, for example, a nurse or technician, to control the image seen by the video camera. That control over the image may be a remote control, from any place in the operating room or from a remote location, for example, by communication over the Internet. This permits an accurate image of live surgery to be broadcast without disturbing the surgeon and without touching the microscope. The adapter is controlled by a conventional PC (Personal Computer) using a PC motor controller board, or may be controlled through a dedicated joy stick computer control system. The PC is preferably able to show individual frames ("frame grabber") or a sequence. The adapter is a communication tool to keep an operative field of microsurgery in view on a monitor during an operation without touching the microscope or the camera.

The controls of the adapter are independent from the microscope, so that the image may be moved in x-y position, changed in focus, changed in exposure and changed in magnification, without touching the microscope. For example, an exact degree of magnification may be provided by remote operation of the zoom lens system, when change in magnification is difficult or not possible by operation of the microscope. The adapter has (i) an independent motor, controlled by the user, to focus the image on the camera's imaging device; (ii) two independent motors, each controlled by the user, which provide multidirectional (x and y axii) orientation of the image by moving a mirror or prism; (iii) an automatic motor control program (default position) to control the directional motors so that they return the mirror to its center preset position when it is released; and (iv) an independent motor, controlled by the user, to adjust the aperture for brightness (exposure) control; and (v) an independent motor, controlled by the user, to adjust the magnification of the image by operation of a zoom lens system.

The adapter has a first motor control system which will adjust the focus of the camera by axial movement of the barrel of a zoom lens system. The adapter has second and third motor control systems which move a mirror and thereby permit the image from the microscope to be oriented about the x and y axii (or any combination) relative to the image plane (imaging device) of the camera, so that the point of interest in the viewed object may be centered on the camera image plane.

The first motor control system, for focusing, preferably consists of a precision pulse motor which has a digital encoder and an output shaft having an elongated worm gear fixed thereon. The worm gear meshes with a nut gear fixed to the zoom lens system barrel. Rotation of the worm gear brings the zoom lens system barrel closer, or further away, relative to the microscope viewing port to focus the image.

A flat disk-like mirror is mounted, in its normal position, to reflect the image at 45 degrees from the focusing lens system (zoom lens system) to the television camera image plane. An alternative reflector is a prism. A control rod (elongated arm), which is turnable in all directions, is fixed to a bracket on the rear face of the mirror. The control rod, at its opposite end, is fixed to a ball. The ball is held within a ball cage and the ball cage is part of a geared bracket. The bracket has a bore with internal spiral gear teeth which are in mesh with a worm gear fixed to an output shaft of an x direction precision pulse motor. The bracket member is elongated and has an arm with gear teeth in mesh with gear teeth of a gear fixed to a shaft of a y direction precision pulse motor.

The mirror may be turned about its center point at any angle through its center point, by manipulation of the control rod. That control rod is moved by the x and/or y pulse motors. An alternative to two motors is a single spherical motor of the type of U.S. Pat. No. 5,175,617, incorporated by reference. Such manipulation of the mirror changes the center of the received image relative to the image plane of the television camera, permitting the point of interest on the viewed object to be centered at the vertical and horizontal center of the image plane and consequently its image to be centered at the vertical and horizontal center of the monitor's screen.

BRIEF DESCRIPTION OF THE DRAWINGS

In the drawings:

FIGS. 1 is a side cross-sectional view of the adapter of the present invention;

FIG. 2 is a front cross-sectional view taken along line A—A of FIG. 1;

DETAILED DESCRIPTION OF THE INVENTION

Figure 3:
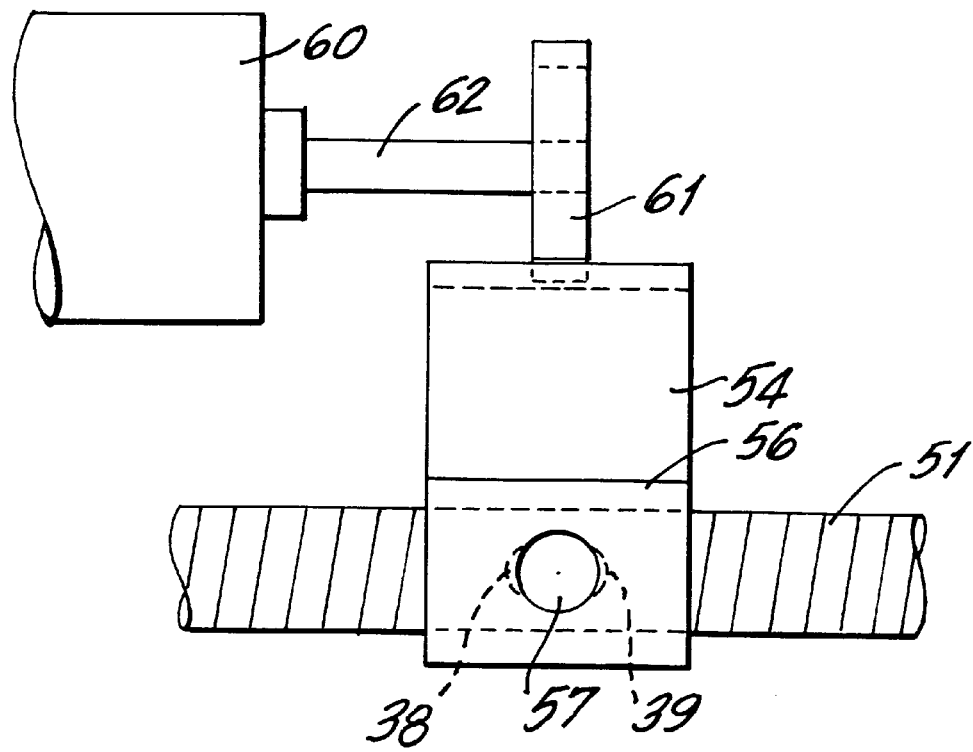
FIG. 3 is a perspective view of the gear bracket.
Figure 4:
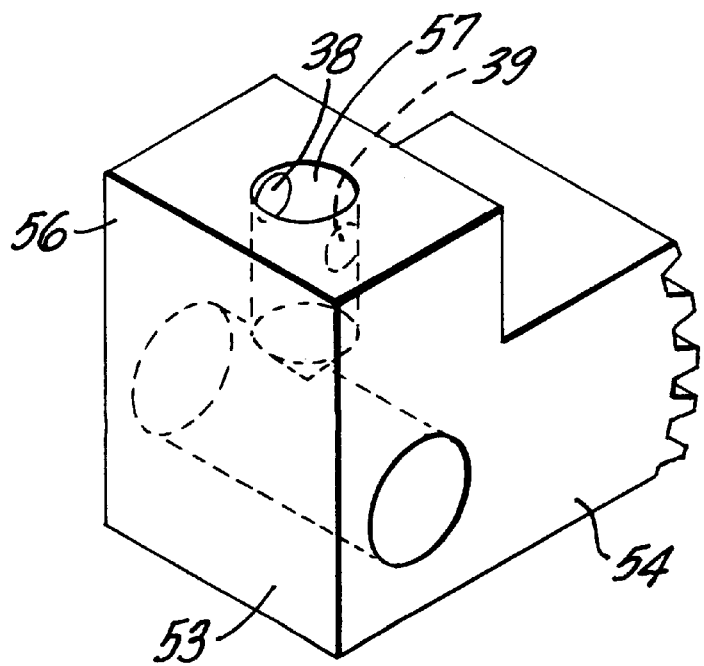
FIG. 4 is a top view of the gear bracket.

As shown in FIG. 1 a stereomicroscope 10 has a viewing port (orifice) 11 with suitable optics to permit the image of the object being viewed to be imaged by a television camera 12. For example, the leading microscope manufacturers, such as Nikon, Canon, Zeiss and Leica-Wild sell microscopes with such a viewing port. A suitable video camera 12 is preferably a lightweight solid-state camera using a CCD (Charge Coupled Device) pick-up imaging device at its image plane. Suitable cameras include the SONY (TM) Model Nos. DXC 003, DXC 999, DXC 760, DXC 960, DXC 107, DXC 101 and cameras from JVC, Panasonic, Toshiba and Ikegami. The camera includes bayonet or standard "C" mounts. The adapter is suitable for most types of cameras used in medical and industrial applications.

The adapter 15 of the present invention fits between the microscope 10 and the camera 12. The adapter 15 has a housing 16, preferably of machined metal and is tubular (ring-like in cross-section). The housing 17 has imaginary central axii 18,19 and the axis 18 is 90° relative to axis 19 in the same imaginary plane.

A centering system 20 is positioned within housing 16 and includes a glass mirror 21. The mirror 21 is flat with an F.5 focal distance and is disk-like (rounded), i.e., shaped like a flat coin. The mirror 21 has a highly reflective front surface. The mirror is "superflat", i.e., flat to one-quarter fringe. Alternatively, a prism may be used in place of the mirror. The mirror 21 is mounted on bracket 22 which is mounted on a gimbal-like arrangement 23 which permits the mirror 21 to be turned in all directions about its center, i.e., turned about two axii which are perpendicular to each other (imaginary x and y axii). The x axis is into the paper in FIG. 1 and is through the pins 25 in FIG. 2. The y axis is into the paper in FIG. 2 and through the pins 32,33 in FIG. 1.

The bracket 22 is rotatably mounted by its two opposite extending shaft-like pins 25 which are rotatably mounted in round indentations 27 of the gimbal member 29.

The bracket 22 may be turned clockwise or counterclockwise about the center of arms 25 (FIG. 1). The gimbal member 29 has two opposite indentations 30,31 which enclose the ends of pins 32,33 respectively. The pins 32,33 are fixed in tubular mounting member 34 which is held in the housing 16. The gimbal member 29 is rotatable about the pins 32,33.

An extension arm 35 (control rod) has its inner end (proximal end) fixed to the bracket 22. A small ball 36 is fixed at the outer end (distal end) of the extension arm 35 (control rod) and fits within a ball cage 37 (partial spherical seat) formed on the inner walls of the bore 38 of a gear bracket 54.

As shown in FIGS. 1 and 2 the adapter 15 includes four digital pulse motors. These motors, and the zoom control motor 80, are precision direct current digital pulse motors each of which has an internal encoder to relay back its shaft position, and an externally extending output shaft. They operate from digital commands generated by the controller CPU which may be a PC (Personal Computer). The motors are available from Maxim, Switzerland, and are precision DC servo motors.

The first motor 30 controls the iris (iris diaphragm). Its output shaft 31 has a gear 32 fixed thereon which meshes with gear teeth on the end of a control lever 33. The lever 33 controls the opening and closing of leaf iris 34 (adjusts the aperture) which is of conventional construction, using overlapping leaves. For example, a precision iris diaphragm with a 1–30 mm (min. 1 mm–max 30 mm) lever adjust aperture is available from Edmund Scientific, Barrington, N.J.

Figure 6:
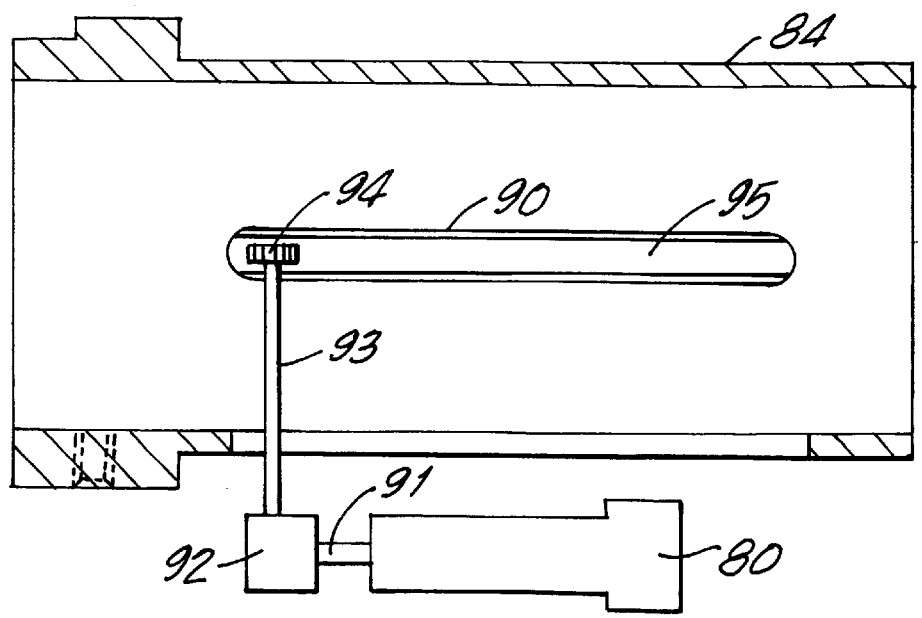
FIG. 6 is a side view of the zoom lens barrel showing the zoom control motor.

The second motor 40 controls the focus by moving the zoom lens system barrel 41 of zoom lens system 82 within its tracks. The motor 40 has an output shaft which has spiral worm gear 42 fixed thereto. The worm gear 42 rotates in bearings 44a,44b. In FIG. 1 the barrel 41 has two external handles 46a, 46b which are used to manually operate cams internal to the barrel and thereby adjust the magnification (zoom). Preferably the magnification (zoom) is adjusted by a motor controlled by the computer, as shown in FIG. 6.

The zoom systems 82 and 83 are video lenses having manual or preferably motor adjustment of zoom and motor adjustment of focus. They preferably zoom in the range from a focal length (mm) of 60 mm to 120 mm. The range of focal lengths selected for the zoom lens system depends upon the use of the microscope and the type of camera and the desired magnification and, preferably, is a zoom range of 60 mm and includes 100 mm for eye surgery, 100 mm for nose and throat surgery and 140 mm for neurosurgery.

Figure 5:
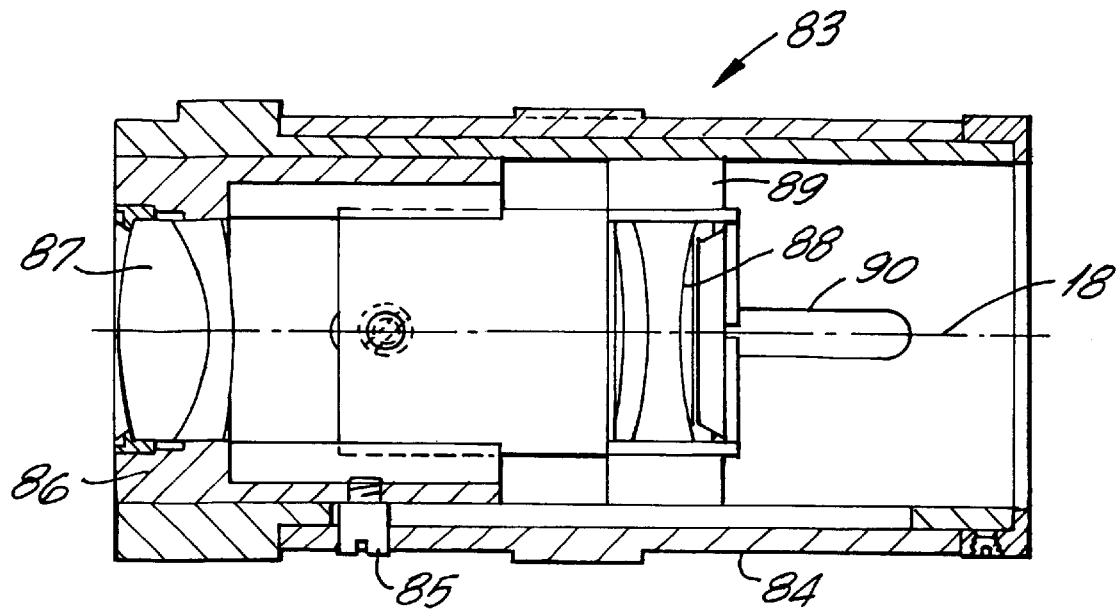
FIG. 5 is a side cross-sectional view of the zoom lens system.

As shown in FIG. 5, the preferred zoom lens system 83 has a cylindrical barrel 84. That barrel 84 is moved (the lens system 83 is moved), for control of focus, by motor 40 as in FIG. 1. The barrel 84 is connected through screws 85 to inner ring 86. A compound lens 87 is mounted in ring 86.

A compound lens 88 is mounted in an inner ring 89 which is moved, for adjustment of magnification, along the optical axis 18. For zooming, the lens 88 is moved and lens 87 remains in place. The ring 89 is mounted on a threaded rack 95 which is exposed through the slot 90 in the barrel 84.

As shown in FIG. 6 a pulse motor 80 has an encoder and is controlled by the controller CPU, like the other motors. Its output shaft 91 is connected to a right angle transmission 92 whose output shaft 93 has a pinion gear 94 at its end. That pinion gear 94 is in mesh with the gear teeth on the rack 95. The rack 95 is fixed to the inner ring 89. To obtain a zoom adjustment the motor 80 is operated causing the pinion gear 94 to rotate. Such rotation of gear 94 moves rack 95, thereby moving the ring 89 and its lens 88 to adjust the magnification.

A third motor 50 and fourth motor 60 control the movement of the mirror 21 about the x and y axii, respectively. The motor 50 has an output shaft 58 which is fixed to worm gear 51, the worm gear 51 being rotatably supported by bearings 52a, 52b. A gear bracket 53 has a bore 59 with internal gear teeth which meshes with the worm gear 51. When the worm gear rotates it moves the bracket 53 in the back and forth directions of arrows B. The bracket 53 is elongated so that its elongated teeth 55 stay in mesh with the narrow teeth 61 when the fixture is translated in the B directions. The bracket 53 is generally L-shaped and has an arm 54 with gear teeth 55 at its free end (FIG. 2). The gear teeth 55 mesh with the gear teeth of gear 61. The bracket 53 has an upstanding arm 56 having a bore 57 therein. The bore has two opposite spherical shaped indentations 38,39 near its top which capture the ball 36 and form a ball cage.

In operation, the user will generate a control signal to move the mirror in any direction (about x and y axii) by operation of a computer keyboard, joy stick, mouse or other control device. The control signal will be converted to the corresponding number of pulses by a computer CPU circuit board (not shown). The motor 50 is activated and turns the worm gear 51, for example, 3 degrees clockwise (as shown in FIG. 2). This causes bracket 53 to move to the right and pulls the ball 37 to the right (FIG. 1). The ball 36 is mounted on the arm 35 and the gimbal 29 is pivoted on pins 25 so that the mirror moves in the opposite direction (the direction opposite arrow A and counterclockwise about pins 25—the x axis).

To move the mirror 21 about the y axis the user generates a y axis control signal. The motor 60 is activated and its shaft 62, for example, turns clockwise 3 degrees (FIG. 2). The gear 61 will rotate clockwise 3 degrees, causing the bracket arm 54 to turn counterclockwise 3 degrees (FIG. 2). When arm 56 turns counterclockwise 3 degrees it moves the ball 36 to the left (FIG. 2). The top of the arm 35, and the mirror, are turned clockwise 3 degrees (about y axis). The image on the mirror, which is the image of the object being viewed by the microscope, may be turned in any direction, so that any portion of that image may be directed to any portion of the image plane of the camera.

The microscope mount includes a ring 70 having a tubular nose portion 71 which is attached to housing 16. The nose portion 71 fits within a viewing port of the microscope. An attachment ring 72 having a fixing screw 73 is connected to housing 16 and is used to mount the television camera. The ring 72 accepts conventional camera mount systems including "C" and bayonet types.

It is an important feature of the present invention that the mirror be automatically returned to its center (normal position) on a user generated command or/and as a default option. The computer or CPU board has that center position in its memory. It also has in its memory the present position of the mirror derived from the encoders of the x and y motors. When the user commands the central position, the computer subtracts (or adds) the present position from the central position and issues the digital pulse signals to energize the x and/or y motors to move the mirror to its central position.

What is claimed is:

1. An adapter adapted to be positioned between a television camera having an image plane with a center, and a microscope producing an image, the adapter transmitting an image of an object being viewed by the microscope to the television camera, the adapter comprising:

(a) a housing;
    (b) focus means within the housing to focus the image including a lens holder movable within the housing, a lens system mounted within the lens holder, a linkage means to move the lens holder and thereby focus the image;
    (c) a mirror mounted within the housing, mirror mounting means to mount the mirror for swinging motion about two imaginary perpendicular axii;
    (d) a first motor means connected to the mirror mounting means to move the mirror about one axis; and
    (e) a second motor means connected to the mirror mounting means to move the mirror about the other axis, whereby the first and second motor means move the mirror to reflect a selected portion of the image on the center of the camera's image plane.

2. An adapter as in claim 1 wherein the focus means includes a zoom lens system mounted in a barrel and a pulse motor to move the linkage means.

3. An adapter as in claim 2 wherein the focus means includes a pulse motor and the linkage means includes a worm gear rotatably mounted within the housing and a gear in mesh with the worm gear and fixed to the barrel and wherein the worm gear is driven by the pulse motor to thereby move the barrel.

4. An adapter as in claim 1 wherein the mirror is a flat disk-like mirror having a center.

5. An adapter as in claim 1 wherein the mirror, in its normal centered position, reflects the image at a 45 degree angle.

6. An adapter as in claim 1 wherein the mirror mounting means includes a mirror bracket fixed to the mirror, first gimbal means to freely rotatably mount the mirror about the one axis, and second gimbal means to freely rotatably mount the first means about the other axis.

7. An adapter as in claim 1 and including a gear bracket and a control arm extending within the housing and connected between the gear bracket and the mirror bracket.

8. An adapter as in claim 7 wherein the gear bracket has a ball cage and a ball is fixed to the arm and is movable within the ball cage.

9. An adapter adapted to be positioned between a television camera having an image plane with a center, and a microscope producing an image, the adapter transmitting an image of an object being viewed by the microscope to the television camera, the adapter comprising:

(a) a housing;
    (b) focus means within the housing to focus the image including a movable lens barrel, a lens mounted within the lens barrel, means to move the lens barrel and thereby focus the image;
    (c) a reflector mounted within the housing, reflector mounting means to mount the reflector for swinging motion about two imaginary perpendicular axii;

(d) reflector control means to move the reflector to reflect a selected portion of the image on the center of the camera's image plane, the reflector control means including a control rod means within the housing to move the reflector; and (e) motor means to move the control rod means in response to computer generated signals.

10. An adapter as in claim 9 wherein the lens is a zoom lens system.

11. An adapter as in claim 9 wherein the motor means includes two pulse motors each having an output shaft and an encoder means to derive the position of the output shaft.

12. An adapter as in claim 9 wherein the reflector mounting means includes a gimbal which is rotatable about two perpendicular axii.

13. An adapter as in claim 9 wherein the reflector is a mirror which is flat and in the form of a disk.

14. An adapter adapted to be positioned between a television camera having an image plane with a center, and a microscope producing an image, the adapter transmitting an image of an object being viewed by the microscope to the television camera, the adapter comprising:

(a) a housing;

(b) means within the housing to focus the image;

(c) a reflector mounted within the housing, reflector mounting means to mount the reflector for swinging motion about two imaginary axii to reflect a selected portion of the image on the center of the camera's image plane;

(d) motor means to move the reflector about the axii, the motor means comprising a first and a second motor; and (e) reflector return means including computer memory to control the first and second motors and to automatically return the mirror to a centered normal position.

15. An adapter as in claim 14 and including a zoom lens system within the housing to focus the image.

16. An adapter as in claim 14 wherein each of the motors is a pulse motor having an output shaft and an encoder to derive the position of the output shaft.

17. An adapter as in claim 14 wherein the reflector mounting means includes a gimbal which is rotatable about two perpendicular axii.

18. An adapter as in claim 14 wherein the reflector is a mirror which is flat and in the form of a disk.

* * * * *